United States Patent
Bass et al.

(10) Patent No.: US 7,315,901 B1
(45) Date of Patent: Jan. 1, 2008

(54) METHOD AND SYSTEM FOR NETWORK PROCESSOR SCHEDULING OUTPUTS USING DISCONNECT/RECONNECT FLOW QUEUES

(75) Inventors: Brian Mitchell Bass, Apex, NC (US); Jean Louis Calvignac, Cary, NC (US); Marco C. Heddes, Raleigh, NC (US); Michael Steven Siegel, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,913

(22) Filed: Apr. 13, 2000

(51) Int. Cl.
  *G06F 15/173* (2006.01)
  *H04L 12/24* (2006.01)

(52) U.S. Cl. ............... 709/240; 709/238; 370/235; 370/395.4; 370/395.42; 370/468

(58) Field of Classification Search ............... 709/102, 709/100, 200–253; 718/100, 101, 102; 370/200–546
  See application file for complete search history.

(56) References Cited

U.S. PATENT DOCUMENTS

| | | | | |
|---|---|---|---|---|
| 5,367,523 A | | 11/1994 | Chang et al. ............ | 370/84 |
| 5,465,335 A | * | 11/1995 | Anderson ............... | 709/107 |
| 5,533,009 A | * | 7/1996 | Chen .................... | 370/232 |
| 5,689,508 A | | 11/1997 | Lyles ................... | 370/391 |
| 5,768,594 A | * | 6/1998 | Blelloch et al. ........ | 717/149 |
| 5,781,531 A | | 7/1998 | Charny ................. | 370/232 |
| 5,793,747 A | * | 8/1998 | Kline .................. | 370/230 |
| 5,818,815 A | * | 10/1998 | Carpentier et al. ..... | 370/230.1 |
| 5,818,839 A | * | 10/1998 | Sterne et al. ......... | 370/391 |
| 5,835,494 A | * | 11/1998 | Hughes et al. ......... | 370/397 |
| 5,835,767 A | * | 11/1998 | Leigh ................. | 709/104 |
| 5,850,399 A | | 12/1998 | Ganmukhi et al. ...... | 370/412 |
| 5,917,822 A | | 6/1999 | Lyles et al. .......... | 370/395 |
| 5,923,644 A | | 7/1999 | McKeon et al. ........ | 370/230 |
| 5,923,656 A | | 7/1999 | Duan et al. .......... | 370/395 |
| 5,926,459 A | | 7/1999 | Lyles et al. ......... | 370/230 |

(Continued)

FOREIGN PATENT DOCUMENTS

EP  0 944 208 A2  9/1999

(Continued)

OTHER PUBLICATIONS

IBM Technical Disclosure Bulletin, vol. 35, No. 2, Jul. 1992, pp. 233-239 "Architecture for High Performance Transparent Bridge".

*Primary Examiner*—Lewis A. Bullock, Jr.
(74) *Attorney, Agent, or Firm*—Josh G. Cockburn; Dillon & Yudell LLP

(57) ABSTRACT

A system and method of moving information units from a network processor toward a data transmission network in a prioritized sequence which accommodates several different levels of service. The present invention includes a method and system for scheduling the egress of processed information units (or frames) from a network processing unit according to stored priorities associated with the various sources of the information units. A system for allowing peak bursts based on a system of credits and charges is taught along limits on such peak bursts. Also taught is a system for preventing a flow's disconnection and reconnection to the queues from allowing it to unfairly achieve an improved position.

17 Claims, 12 Drawing Sheets

U.S. PATENT DOCUMENTS

| | | | |
|---|---|---|---|
| 5,940,375 A | 8/1999 | Soumiya et al. | 370/249 |
| 5,959,993 A | 9/1999 | Varma et al. | 370/397 |
| 5,995,511 A | 11/1999 | Zhou et al. | 370/412 |
| 5,996,019 A | 11/1999 | Hauser et al. | 709/235 |
| 6,064,677 A * | 5/2000 | Kappler et al. | 370/395.43 |
| 6,396,843 B1 * | 5/2002 | Chiussi et al. | 370/418 |
| 6,560,238 B1 * | 5/2003 | Yu et al. | 370/412 |
| 6,732,199 B1 * | 5/2004 | Yu et al. | 710/52 |
| 6,810,043 B1 * | 10/2004 | Naven et al. | 370/412 |
| 6,947,996 B2 * | 9/2005 | Assa et al. | 709/232 |

FOREIGN PATENT DOCUMENTS

| | | |
|---|---|---|
| EP | 0 977 402 A2 | 2/2000 |
| WO | WO 97/14240 | 4/1997 |

\* cited by examiner

METHOD AND SYSTEM FOR NETWORK PROCESSOR SCHEDULING OUTPUTS USING DISCONNECT/RECONNECT FLOW QUEUES

CROSS REFERENCE TO RELATED PATENTS

The present invention is related to the following documents, all of which are assigned to the assignee of the present invention and which are specifically incorporated herein by reference:

Patent application Ser. No. 09/384,691, U.S. Pat. No. 6,769,033, filed Aug. 27, 1999 by Brian Bass et al., entitled "Network Processor Processing Complex and Methods", sometimes referred to herein as the Network Processing Unit Patent or NPU Patent.

U.S. Pat. No. 5,724,348 entitled "Efficient Hardware/Software Interface for a Data Switch" issued Mar. 3, 1998, which patent is sometimes referred to herein as the Interface Patent.

Patent application Ser. No. 09/330,968, U.S. Pat. No. 6,222,380 filed Jun. 11, 1999 and entitled "High Speed Parallel/Serial Link for Data Communications", sometimes referred to as the Link Patent.

Various patents and applications assigned to IBM for its multiprotocol switching services, sometimes referred to as "MSS", some of which include Cedric Alexander as an inventor, and are sometimes referred to as the MSS Patents.

Patent application Ser. No. 09/548,907, U.S. Pat. No. 6,795,870 filed concurrently by Brian M. Bass et al. and entitled "Method and System for Network Processor Scheduler". This patent is sometimes referred to herein as the Scheduler Structure Patent.

Patent application Ser. No. 09/548,910, U.S. Pat. No. 6,862,292 filed concurrently by Brian M. Bass et al. and entitled "Method and System for Network Processor Scheduling Outputs Based on Multiple Calendars". This patent is sometimes referred to herein as the Calendar Scheduling Patent.

Patent application Ser. No. 09/548,911, U.S. Pat. No. 6,804,249 filed concurrently by Brian M. Bass et al. and entitled "Method and System for Network Processor Scheduling Based on Calculation". This patent is sometimes referred to herein as the Calculation Patent.

Patent application Ser. No. 09/834,141, U.S. Pat. No. 7,123,622filed concurrently by Brian M. Bass et al. and entitled "Method and System for Network Processor Scheduling Based on Service Levels". This patent is sometimes referred to herein as the Service Level Patent.

Patent application Ser. No. 09/548,912, U.S. Pat. No. 6,952,424 filed concurrently by Brian M. Bass et al. and entitled "Method and System for Network Processor Scheduling Outputs Using Queueing". This patent is sometimes referred to herein as the Queueing Patent.

Patent application Ser. No. 09/546,651, U.S. Pat. No. 6,657,962 filed Apr. 10, 2000 by Brian M. Bass et al. and entitled "Method and System for Minimizing Congestion in a Network". This patent is sometimes referred to herein as the Flow Control Patent.

Patent application Ser. No. 09/547,280, U.S. Pat. No. 6,647,718 filed Apr. 11, 2000 and entitled "Unified Method and System for Scheduling and Discarding Packets in Computer Networks". This patent is sometimes referred to herein as the Packet Discard Patent.

BACKGROUND OF THE INVENTION

1. Field of the Invention

The present invention relates to communication network apparatus such as is used to link together information handling systems or computers of various types and capabilities and to components and methods for data processing in such an apparatus. The present invention includes an improved system and method for scheduling the distribution of information units from a flow control system coupled to a plurality of network processing unit toward a data transmission network through a MAC. More particularly, the present invention involves scheduling using a plurality of algorithms to handle a plurality of users who are processing variable size information packets or frames, providing an order to the frames being provided from the flow control system (which may be of the type described in the referenced Flow Control Patent) toward the data transmission network while allowing for a plurality of different priorities to be accorded to the different users.

2. Background Art

The description of the present invention which follows is based on a presupposition that the reader has a basic knowledge of network data communications and the routers and switches which are useful in such network communications. In particular, this description presupposes familiarity with the International Standards Organization ("ISO") model of network architecture which divides network operation into layers. A typical architecture based on the ISO model extends from a Layer 1 (which is sometimes referred to a "L1") being the physical pathway or media through which signals are passed upward through Layers 2 (or "L2"), 3 (or "L3"), and so forth to Layer 7 which is the layer of application programming resident in a computer system linked to the network. Throughout this document, references to such layers as L1, L2, L3 are intended to refer to the corresponding layer of the network architecture. The present description also is based on a fundamental understanding of bit strings used in network communication known as packets and frames.

Bandwidth considerations (or the amount of data which a system can handle in a unit of time) are becoming important in today's view of network operations. Traffic over networks is increasing, both in sheer volume and in the diversity of the traffic. At one time, some networks were used primarily for a certain type of communications traffic, such as voice on a telephone network and digital data over a data transmission network. Of course, in addition to the voice signals, a telephone network would also carry a limited amount of "data" (such as the calling number and the called number, for routing and billing purposes), but the primary use for some networks had, at one point in time, been substantially homogenous packets.

A substantial increase in traffic has occurred as a result of the increasing popularity of the Internet (a public network of loosely linked computers sometimes referred to as the worldwide web or "www.") and internal analogs of it (sometimes referred to as intranets) found in private data transmission networks. The Internet and intranets involve transmission of large amounts of information between remote locations to satisfy an ever-growing need for remote access to information and emerging applications. The Internet has opened up to a large number of users in geographically dispersed areas an exploding amount of remote information and enabled a variety of new applications, such as e-commerce, which has resulted in a greatly-increased load on networks. Other applications, such as e-mail, file transfer and database access further add load to networks, some of which are already under strain due to high levels of network traffic.

Voice and data traffic are also converging onto networks at the present time. Data is currently transmitted over the Internet (through the Internet Protocol or IP) at no charge, and voice traffic typically follows the path of lowest cost. Technologies such as voice over IP (VoIP) and voice over asynchronous transfer mode or ATM (VoATM) or voice over frame relay (VoFR) are cost-effective alternatives for transmission of voice traffic in today's environment. As these services migrate, the industry will be addressing issues such as the changing cost structure and concerns over the trade off between cost of service and quality of service in the transmission of information between processors.

Aspects of quality of service include the capacity or bandwidth (how much information can be accommodated in a period of time), the response time (how long does it take to process a frame) and how flexible is the processing (does it respond to different protocols and frame configurations, such as different encapsulation or frame header methods). Those using a resource will consider the quality of service as well as the cost of service, with the tradeoffs depending on the situation presented. It is desirable to allow a variety of different priorities or scheduling algorithms to a user, with the user deciding whether he wants (and will pay the charges associated with) a guaranteed bandwidth, best efforts, or a guaranteed bandwidth with best efforts for peak. In addition, it is desirable that a system for allocating bandwidth have a system for enforcing the priorities and bandwidth which has been selected by a user by denying the user capacity in excess of that which the user has selected and paid for.

Some prior art systems handle outgoing information units from a processing system in a variety of ways. One suggestion is to use a round robin scheduler which fairness amongst a set of queues. Another one employs several different levels of priorities and a queue for each. In such a system, you have an absolute priority where the highest priority work is processed first and the lowest priority work may never get serviced. Still another method of scheduling outputs involves a plurality of prioritized lists. It is also known to use a hierarchical packet scheduling system. There are even systems which use several different scheduling methods in determining the order in which information units are to be sent toward a data transmission network, using a combination of different scheduling techniques.

Other systems have used a weighted priority technique implemented in the form of a round robin—which serves all queues, with some queues served more frequently than other queues, based on an algorithm which defines the level of service. Even such a weighted priority system would provide service to a user who continually exceeds the service levels assigned to it, continuing to serve, albeit less often, even as it exceeds the assigned service level and making it difficult for the system to enforce a level of service policy.

Considering the size of a packet or frame in determining which customers to serve adds a measure of fairness to a service system, in that a user who is processing large frames takes up more of the system capacity and therefore should receive service less often than a user with small frames. Some of the prior art systems consider the size of the transmission in allocating resources, while others do not. Some communication systems use a uniform, fixed-size packet, making consideration of packet size unnecessary, but others do not consider the size of the packet in allocating resources.

Other prior art system are directed to handling information units which are of a common size as in the so-called Asynchronous Transfer Mode (or ATM) system, so that size of the information unit is not considered in determining the priority of the current or a future information unit. An ATM system with a weight-driven scheduler is one of the solutions which is known in the prior art to schedule outputs from an ATM system.

In any such system, it would be desirable to accommodate system constraints like allocating a certain guaranteed bandwidth to a customer, regardless of frame size, while providing a mechanism to provide the following additional features: accommodating peak inputs which exceed the guaranteed bandwidth while providing protection for large and persistent exceeding of a system parameter and yet efficiently and equitably use the capacity of the network processor to provide outputs to the data transmission network.

It would be desirable to have a system which has maximum flexibility to allow for different types and levels of service as desired. For example, some users want a minimum bandwidth, others might want a minimum bandwidth but allows for bursts, still others may be interested in an economy service which provides for a "best effort" service, either with or without a minimum bandwidth, and any limits on bandwidth or burst size must be enforceable by the scheduling system. It would be desirable if a scheduling system could have any or all of these features in a simple and efficient system which accommodates variable packet length and provides for a weighted fair queueing system of allocating unused bandwidth, but, unfortunately such systems do not exist in the prior art.

It is also desirable that, when a flow queue disconnects and reconnects, that it not achieve a better priority or place in the queue than it would have had if it had not disconnected and reconnected.

Further, in calculating the schedule, it is desirable that a simple and efficient system be implemented to avoid hardware costs associated with a complex calculation for a new place in the schedule for a given flow after it has been serviced.

Thus, the prior art systems for handling data packets for transmission to a network have undesirable disadvantages and limitations which had an effect either on the versatility of the system or the speed with which it could operate.

SUMMARY OF THE INVENTION

The present invention overcomes the disadvantages and limitations of the prior art systems by providing a simple, yet effective, way of handling information units or frames coming out of a processing system and directing frames to output ports for dispatch to a data transmission network. The present invention has particular application to a system in which packets of variable length are being handled from a plurality of users and where a level of service commitment has been made to at least some of the users.

The present invention allows the use of multiple types of service level agreements or commitments made to different users of the system. That is, a minimum guaranteed bandwidth could be provided to one user while other users enjoy shared bandwidth, a peak bandwidth could be permitted for a limited duration of time and maximum burst level service could be provided to a user, all as programmed and without interfering with the service provided to other users.

The present invention has the advantage that it allows the efficient use of bandwidth resource an allows service level commitments to be fulfilled while allowing any remaining bandwidth to be used efficiently and equitably. The present invention allows a simple calculation without performing division to support the calculation of a new location in the calendar for a service flow queue.

The present invention also has the advantage that, upon disconnection and reconnection, a given flow does not achieve an improved position by virtue of its disconnecting.

The present invention uses a slot distance to adjust for the size of the frame and the queue weight to allow a next position to be quickly and easily calculated.

The present invention also maintains a running score of the use of bursts and calculates and maintains an available "credit" to allow bursts within reason but to enforce the system constraints on usage.

The present system also has the advantage of providing a push down stack in which the latest request for service scheduled for a given time slot or cycle is given priority. This is based on the assumption that the user scheduled later must have a higher priority and any delay in serving that user would be a greater percentage delay than a similar delay in serving a lower priority user. Use of this last-in-first-out (LIFO) system for fulfilling slot requests allows the system to minimize the perceived delay in service as a percentage of the normal intervals between successive service when the system overloaded, that is, it has more work than can be handled at the scheduled time.

BRIEF DESCRIPTIONS OF THE DRAWINGS

Having thus set forth some of the limitations and disadvantages of the prior art and some objects and advantages of the present invention, other objects and advantages will be apparent to those skilled in the relevant art in view of the following description of the drawings illustrating the present invention of an improved routing system and method in which.

Figure 6:
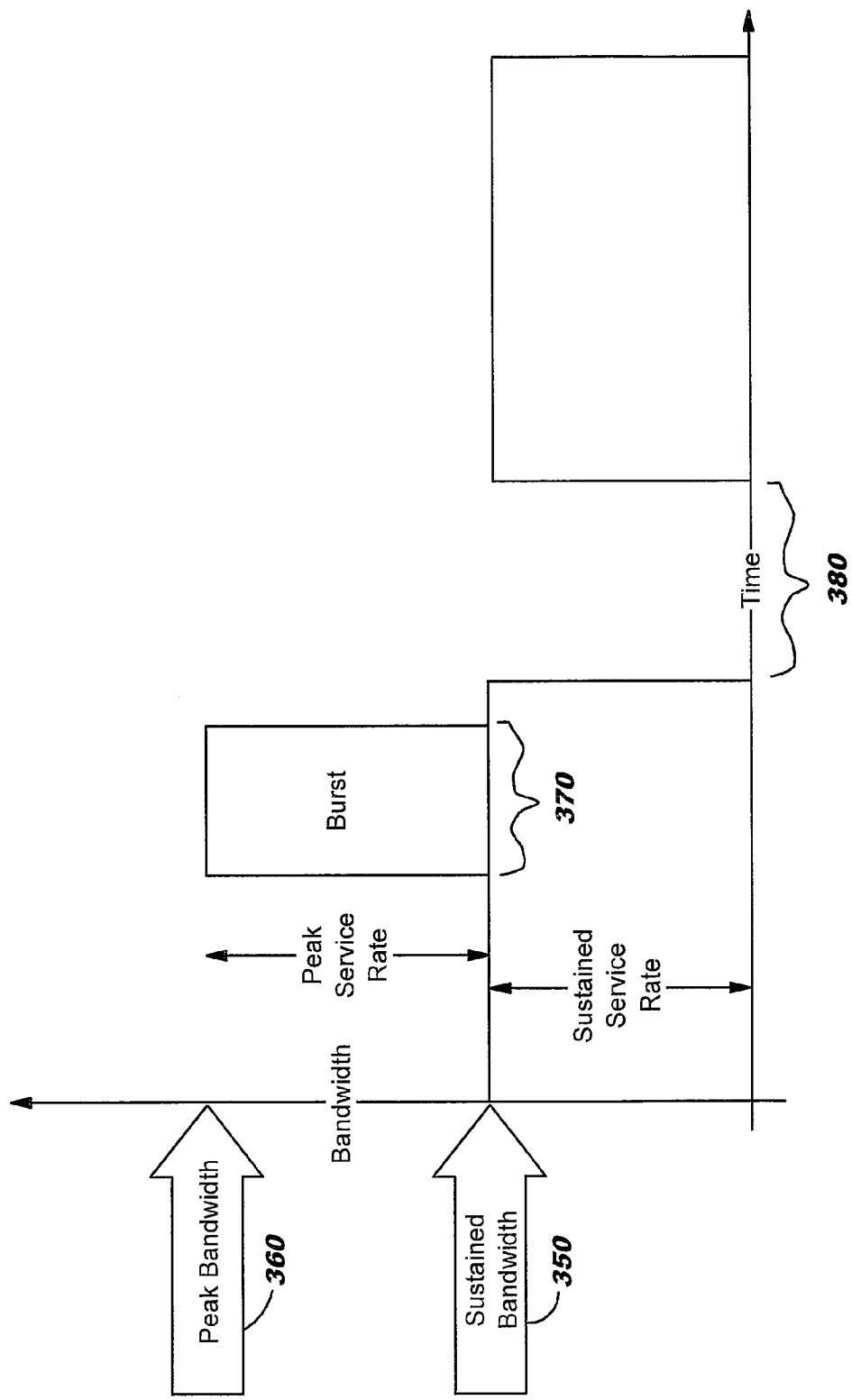
Figure 7:
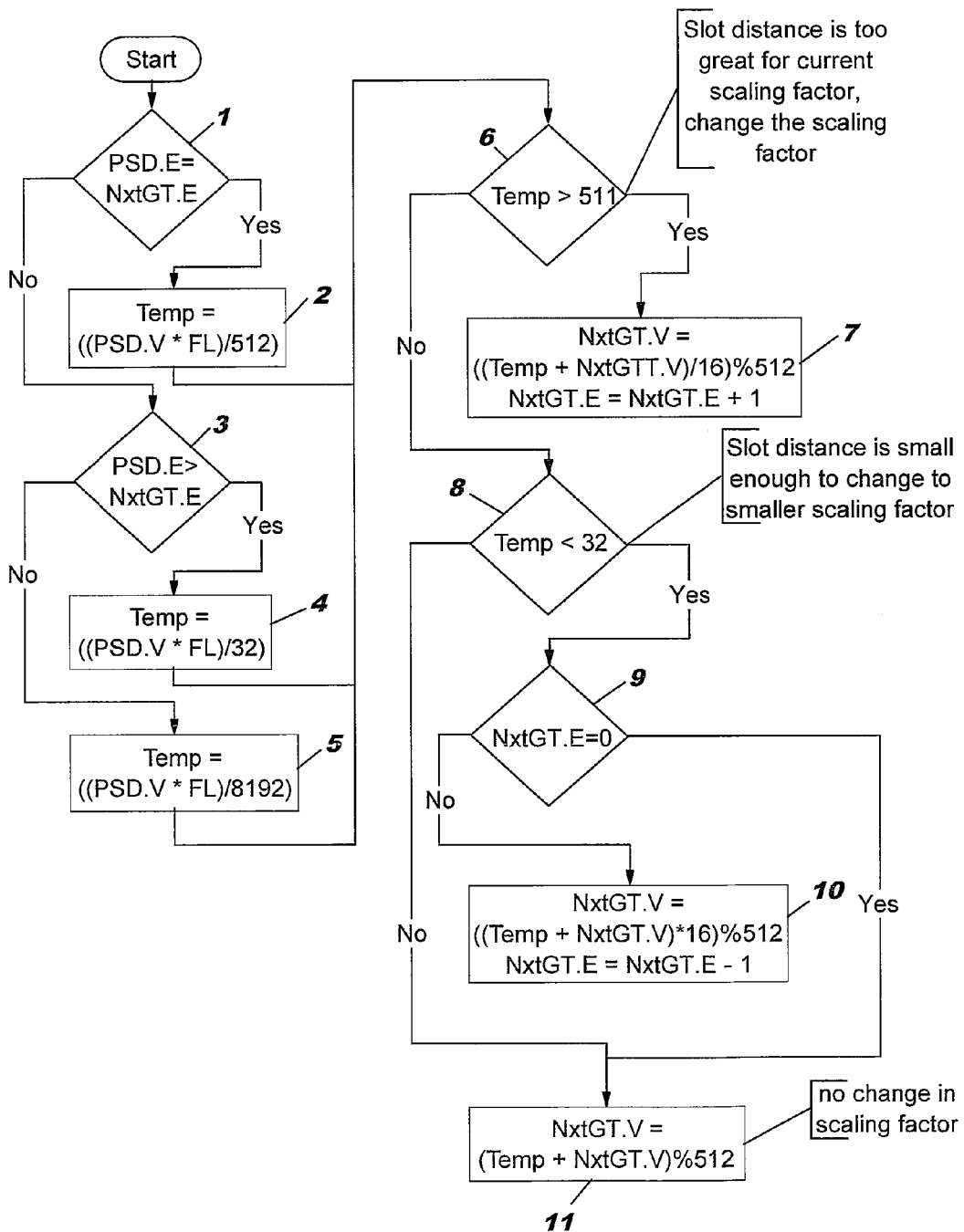
Figure 8:
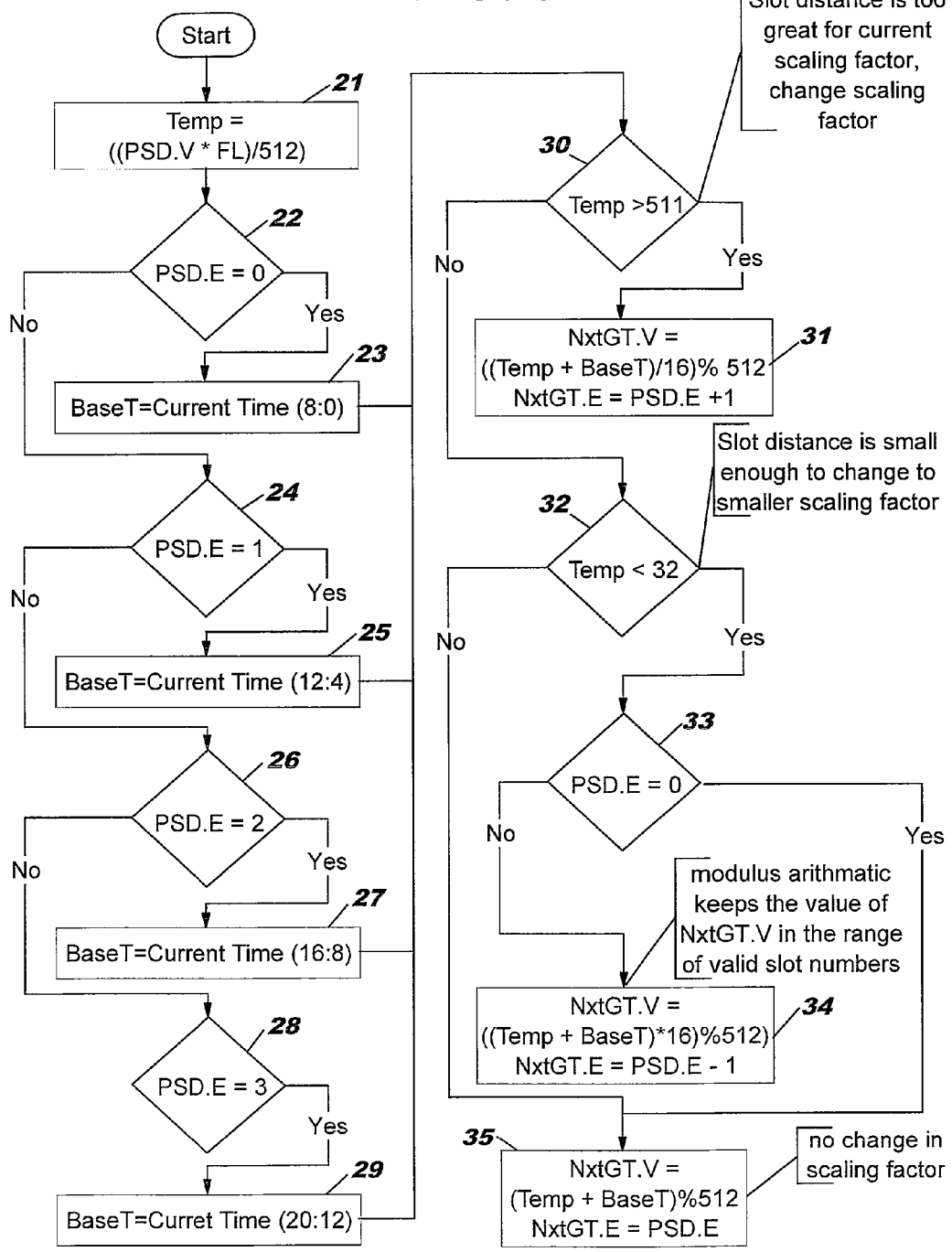
Figure 9:
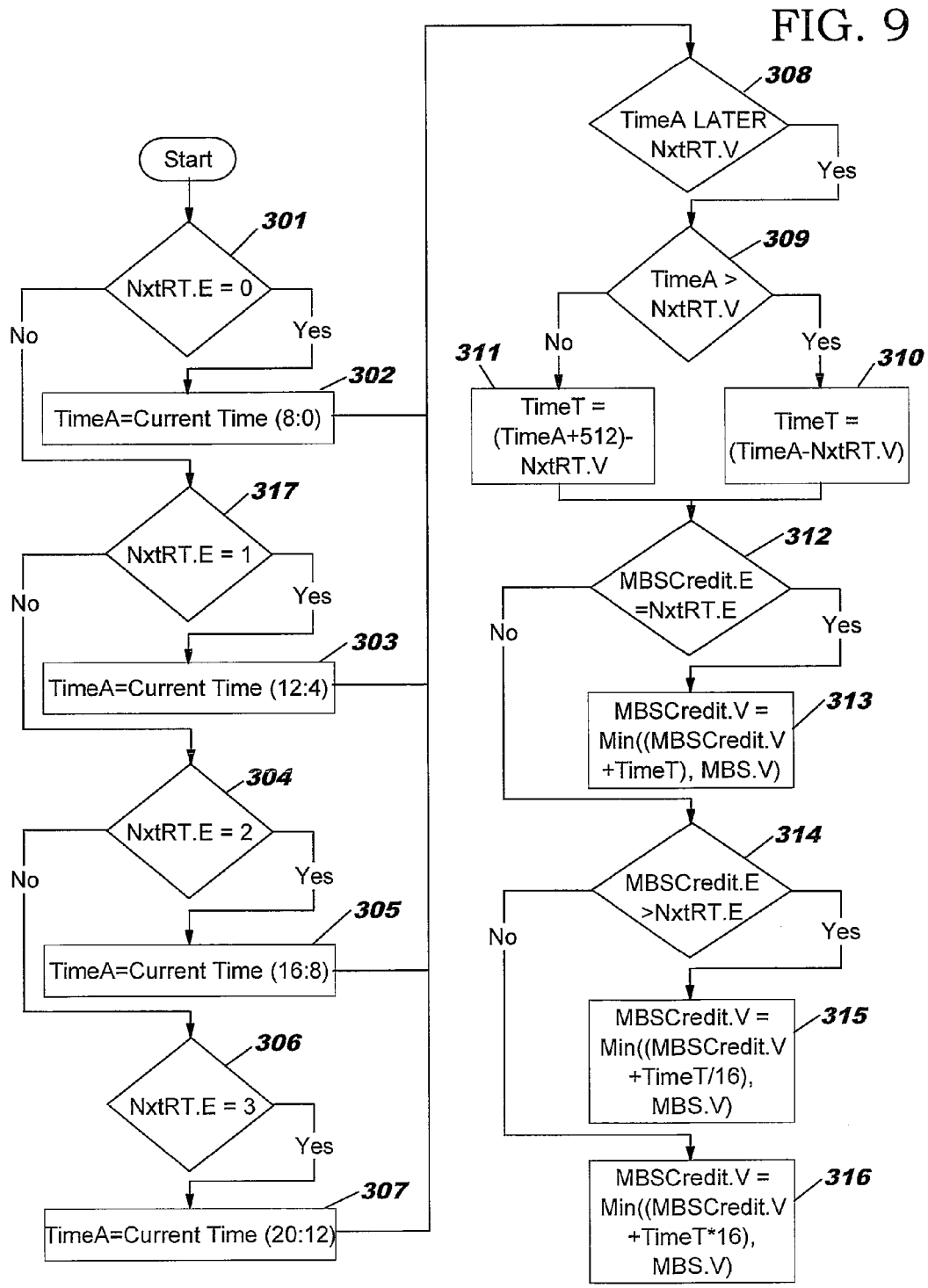
Figure 10:
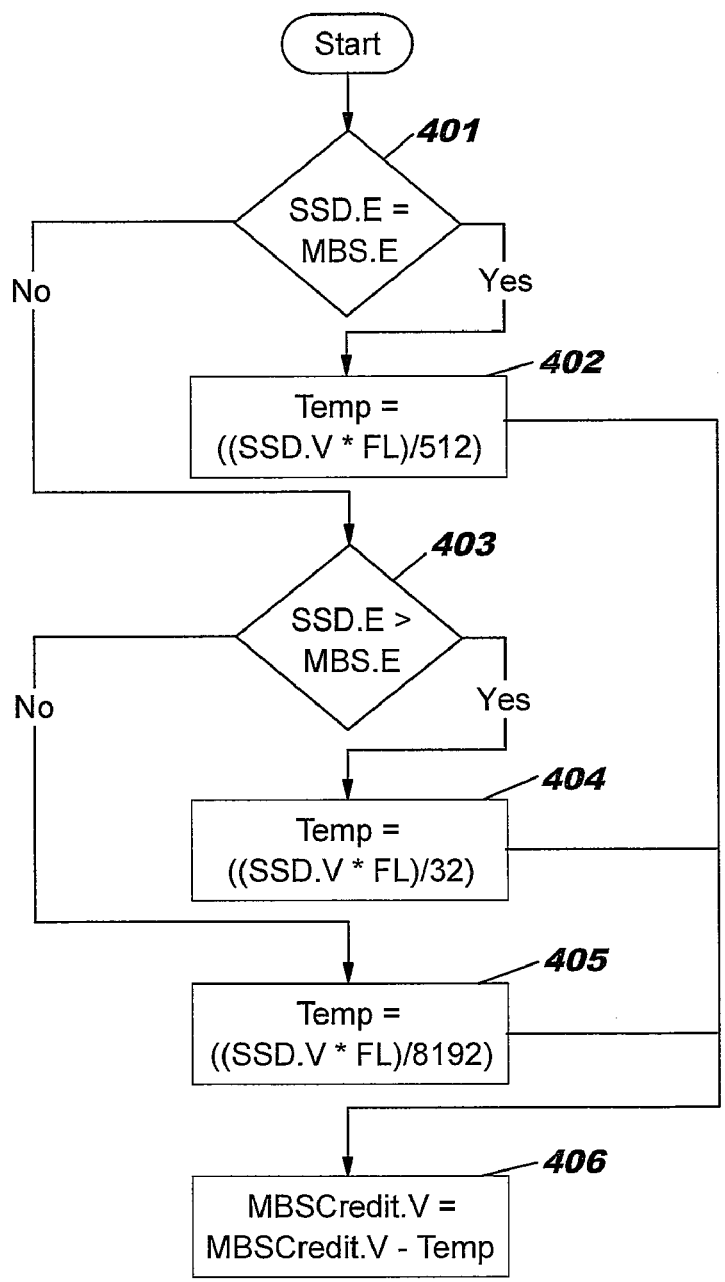
Figure 11:
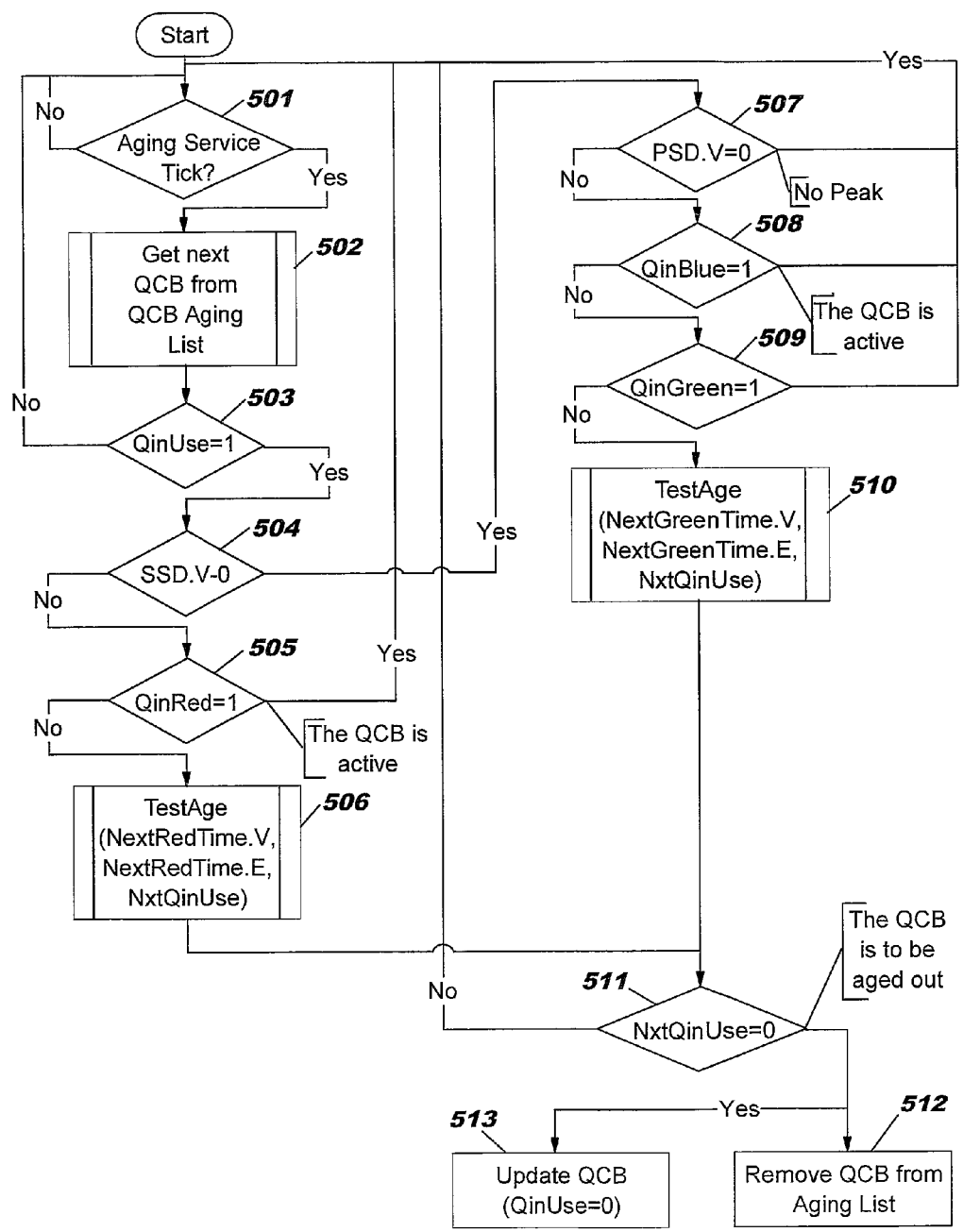
Figure 12:
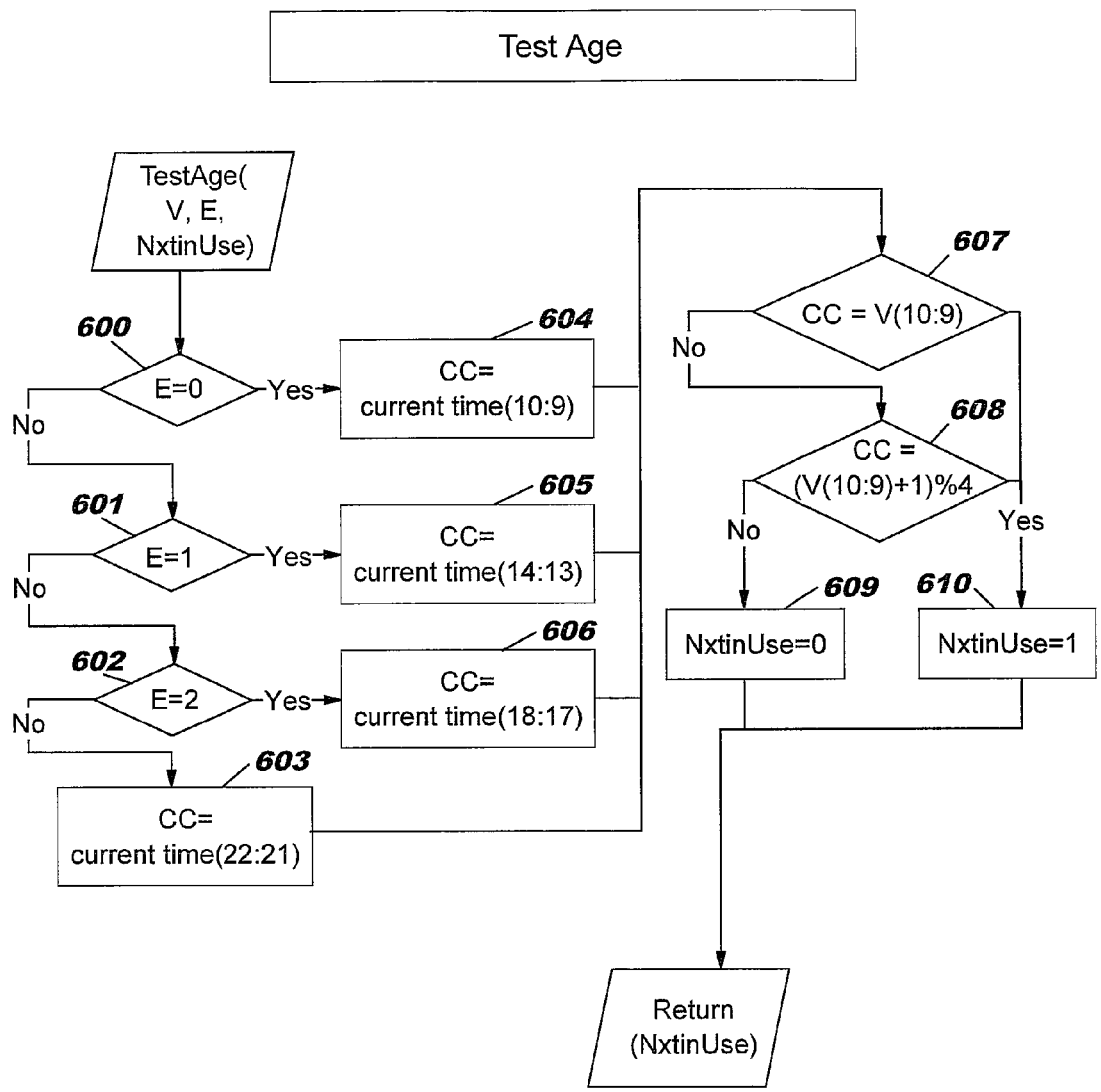

FIG. 6 illustrates maximum burst specifications as used in the present invention; and FIGS. 7-12 are flow charts of various components of the present scheduler, including FIGS. 7-8 directed to calculating the next green time, FIGS. 9-10 directed to calculating and updating burst size credits and FIGS. 11-12 illustrate aging of queue control blocks to avoid benefiting from disconnection and reconnection.

DETAILED DESCRIPTION OF THE PREFERRED EMBODIMENT

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
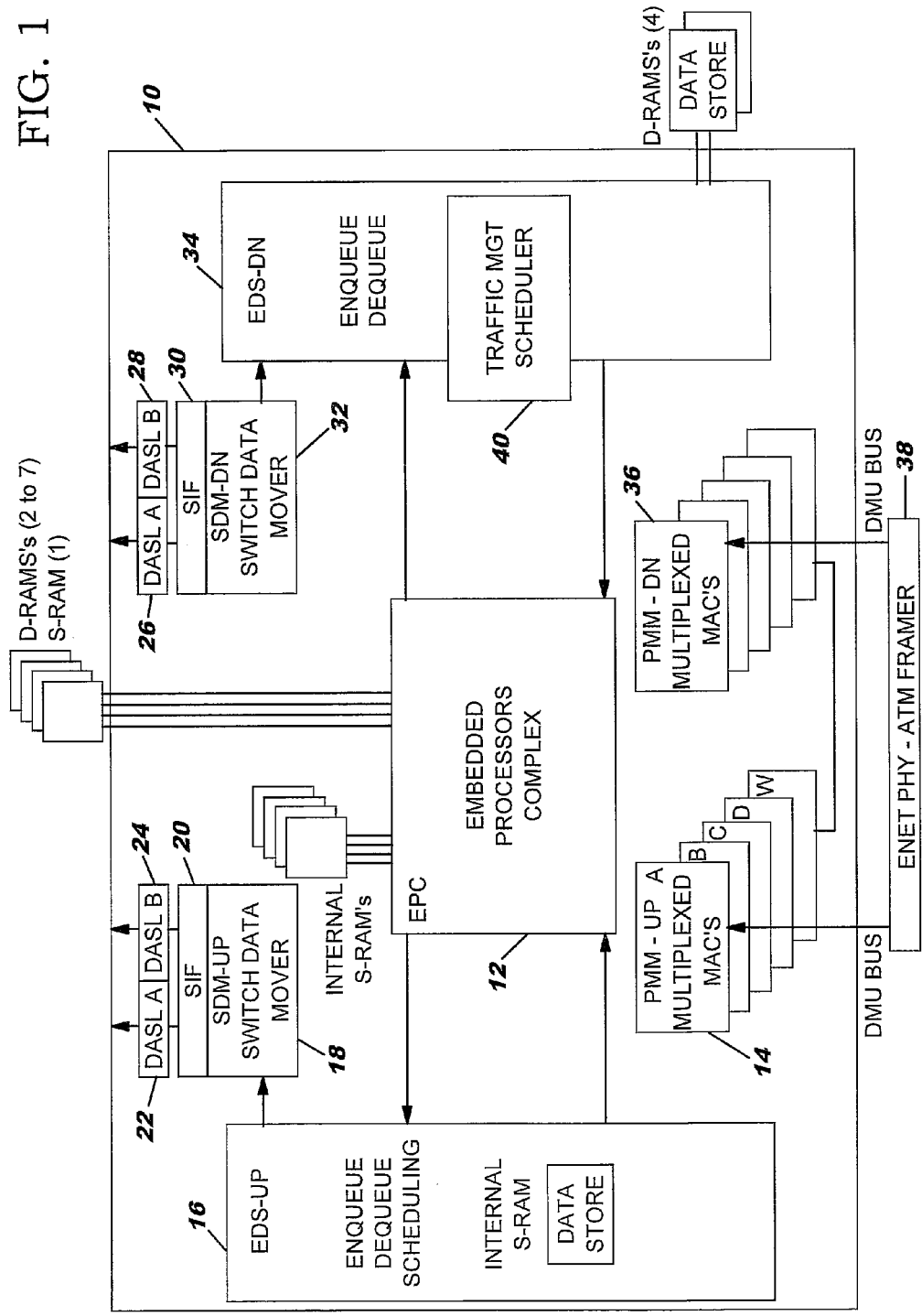
FIG. 1 is a block diagram for an interface device including embedded processor complex which is described in the NPU Patent, showing a DN Enqueue system and scheduler useful in practicing the present invention.

FIG. 1 shows a block diagram of the interface device chip that includes the substrate 10 and a plurality of subassemblies integrated on the substrate. The sub-assemblies are arranged into an upside configuration and a downside configuration, with the "upside" configuration (sometimes also referred to as an "ingress") referring to those components relating to data inbound to the chip from a data transmission network (up to or into the chip) and "downside" (sometimes referred to as an "egress") referring to those components whose function is to transmit data from the chip toward the data transmission network in an outbound fashion (away from the chip or down and into the network). Data flows follow the respective arrangements of the upside and downside configurations; thus, there is a upside data flow and a downside data flow in the system of FIG. 1. The upside or ingress configuration elements include an Enqueue-Dequeue-Scheduling UP (EDS-UP) logic 16, multiple multiplexed MAC's-UP (PMM-UP) 14, Switch Data Mover-UP (SDM-UP) 18, Switch Interface (SIF) 20, Data Align Serial Link A (DASL-A) 22 and Data Align Serial Link B (DASL-B) 24. Data links are more fully described in the Link Patent referenced above, and reference should be made to that document for a greater understanding of this portion of the system. It should be understood that the preferred embodiment of the present invention uses the data links as more fully described in that patent, other systems can be used to advantage with the present invention, particularly those which support relatively high data flows and system requirements, since the present invention is not limited to those specific auxiliary devices such as the data links which are employed in the preferred embodiment.

The components depicted on the downside (or egress) of the system include data 20 links DASL-A 26 and DASL-B 28, switch interface SIF 30, switch data mover SDM-DN 32, enqueue-dequeue-scheduler EDS-DN 34 and multiple multiplexed MAC's for the egress PMM-DN 36. The substrate 10 also includes a plurality of internal static random access memory components (S-RAM's), a traffic management scheduler (TRAFFIC MGT SCHEDULER, also known as the Egress Scheduler) 40 and an embedded processor complex 12 described in greater depth in the NPU Patent referenced above. An interface device 38 is coupled by the respective DMU busses to PMM 14, 36. The interface device 38 could be any suitable hardware apparatus for connecting to the L1 circuitry, such as Ethernet physical (ENET PHY) devices or asynchronous transfer mode framing equipment (ATM FRAMER), both of which are examples of devices which are well known and generally available for this purpose in the trade. The type and size of the interface device are determined, at least in part, by the network media to which the present chip and its system are attached. A plurality of external dynamic random access memory devices (D-RAMS) and a S-RAM are available for use by the chip.

While here particularly disclosed for networks in which the general data flow outside the relevant switching and routing devices is passed through electric conductors such as wires and cables installed in buildings, the present invention contemplates that the network switches and components thereof could be used in a wireless environment as well. For example, the media access control (MAC) elements herein disclosed may be replaced with suitable radio frequency devices, such as those made from silicon germanium technology, which would result in the connection of the device disclosed directly to a wireless network. Where such technology is appropriately employed, the radio frequency elements can be integrated into the VLSI structures disclosed herein by a person of skill in the appropriate arts. Alternatively, radio frequency or other wireless response devices such as infrared (IR) response devices can be mounted on a blade with the other elements herein disclosed to achieve a switch apparatus which is useful with wireless network apparatus.

The arrows show the general flow of data within the interface system shown in FIG. 1. Frames of data or messages (also sometimes referred to as packets or information units) received from an Ethernet MAC 14 off the ENET PHY block 38 via the DMU bus are placed in internal data store buffers 16a by the EDS-UP device 16. The frames may be identified as either normal frames or guided frames, which then relates to method and location of the susequent processing in the plurality of processors. After the input units or frames are processed by one of the pluality of processors in the embedded processor complex, the completed information units are sent to the switch to be delivered to an egress side of a network processor. Once the information units are received on the egress side of the network processor, they are processed by one of the plurality of processors in the embedded processor complex, and when the egress processing is completed, they are scheduled through the scheduler 40 out of the processing unit 10 and onto the data transmission network through the PMM-DN multiplexed MAC's 36 and the physical layer 38.

Figure 2:
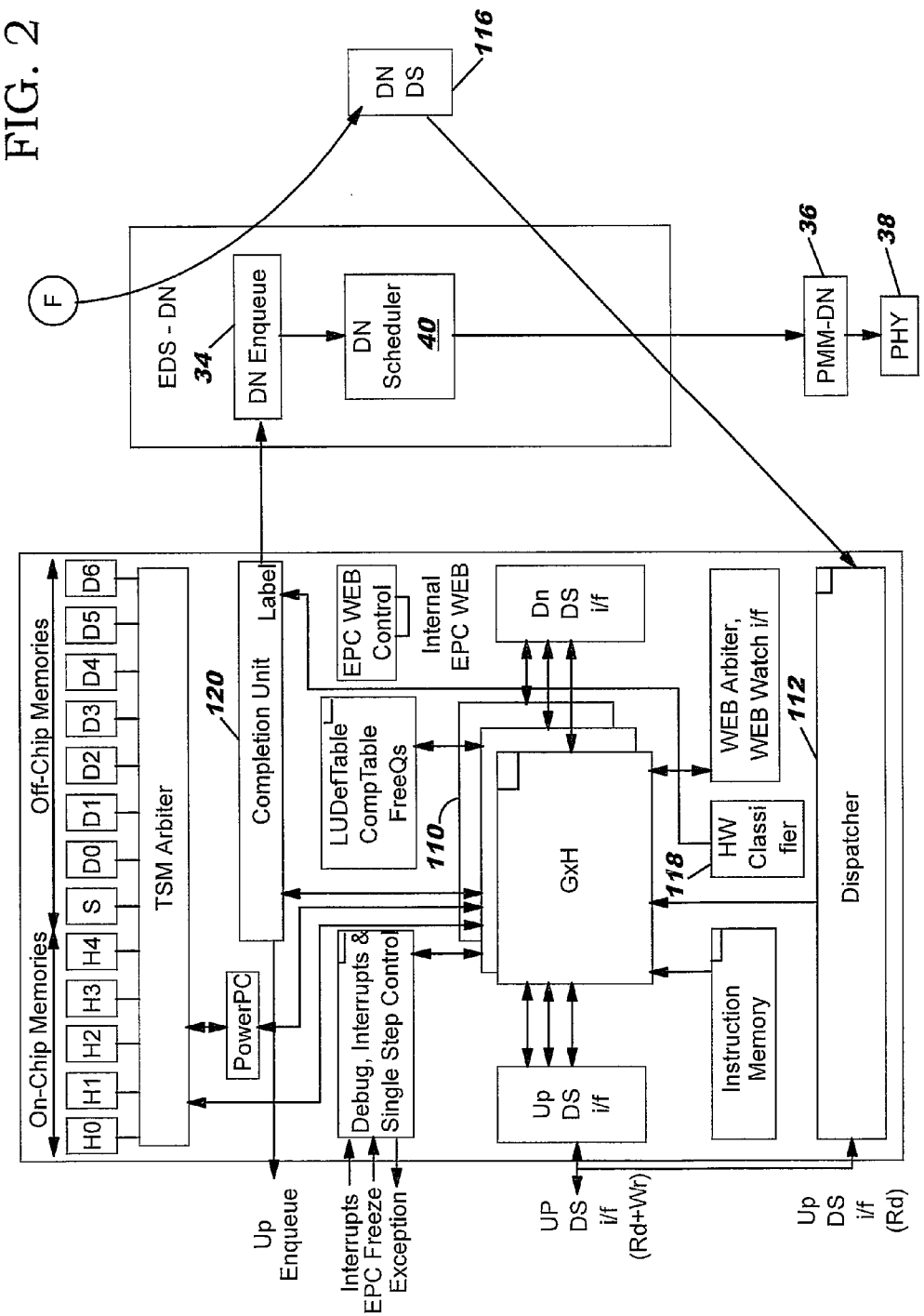
FIG. 2 is a block diagram of an embedded processor complex of type shown in FIG. 1, with the DN Enqueue (and its included scheduler) useful in understanding the present invention.

FIG. 2 is a block diagram of a processing system 100 which can employ the present invention to advantage. In this FIG. 2, a plurality of processing units 110 are located between a dispatcher unit 112 and a completion unit 120. Each egress frame F (from a switch, not shown, attached to the present data processing system) is received and stored into an DOWN data store (or DN DS) 116, then sequentially removed by the dispatcher 112 and assigned to one of the plurality of processing units 110, based on a determination by the dispatcher 112 that the processing unit is available to process the frame. Greater detail on the structure and function of the processing units 110 in particular, and the processing system in general, can be found in the NPU Patent references above and patent applications and descriptions of the individual components such as a flow control device detailed in the Flow Control Patent. Interposed between the dispatcher 112 and the plurality of processing units 110 is a hardware classifier assist 118 which is described in more detail in a pending patent application Ser. No. 09/479,027 filed Jan. 7, 2000 by J. L. Calvignac et al. and assigned to the assignee of the present invention, an application which is incorporated herein by reference. The frames which are processed by the plurality of network processors 110 go into a completion unit 120 which is coupled to the DN Enqueue 34 through a flow control system as described in the Flow Control Patent and the Packet Discard Patent. The DN Enqueue 34 is coupled through the PMM DN MAC's 36, then by the DMU data bus to the physical layer 38 (the data transmission network itself).

Figure 3:
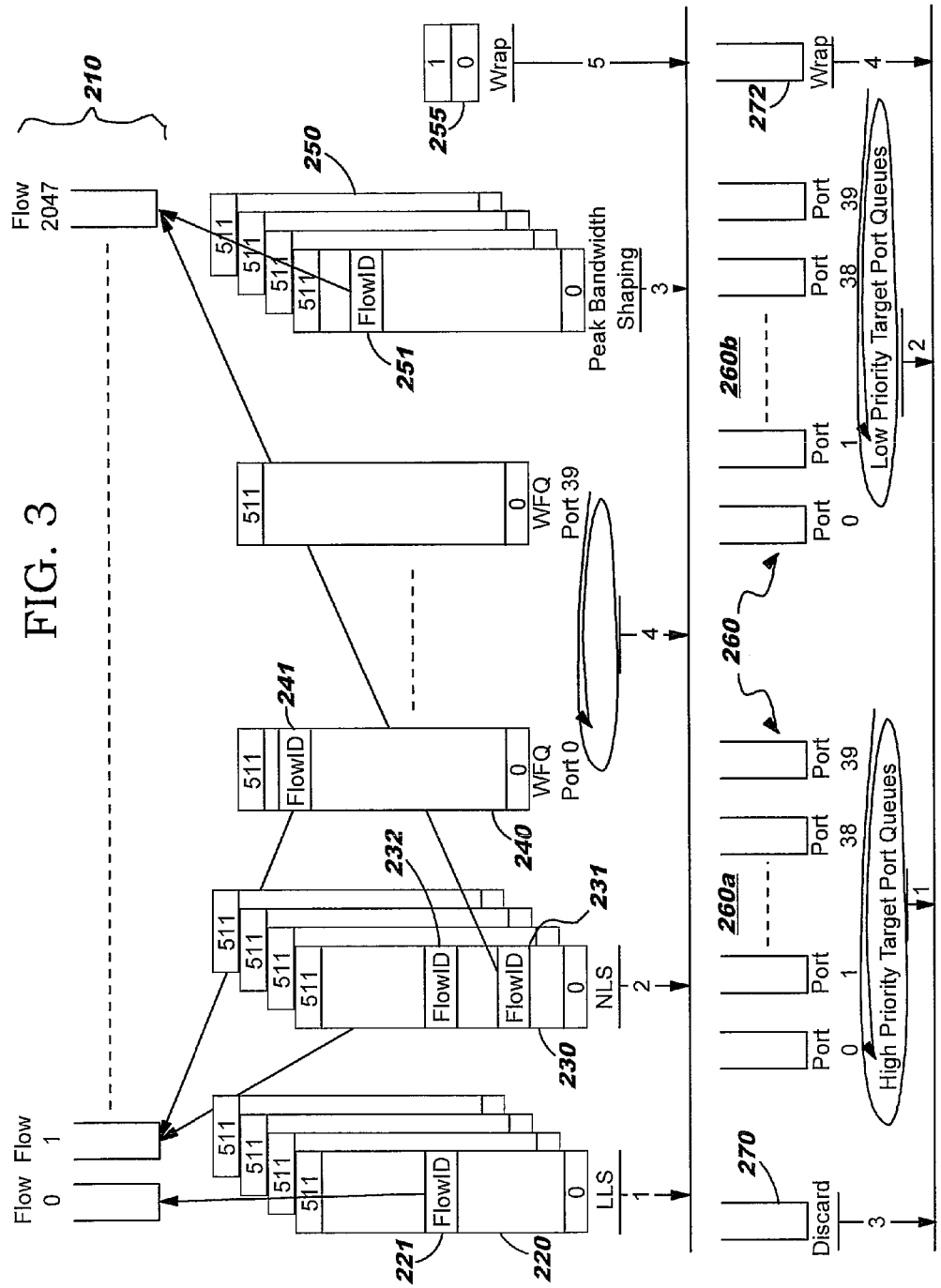
FIG. 3 illustrates the scheduler of FIGS. 1-2, illustrating a system for scheduling egress of variable length packets according to the preferred embodiment of the present invention, in an "egress scheduler"

The egress scheduler 40 of FIG. 3 provides a structure and method of operation which permits the functions of scheduling frame transmission from a network processing unit to a data transmission network in accordance with a minimum bandwidth algorithm, peak bandwidth algorithm, weighted fair queueing techniques and maximum burst size scheduling in a single unified scheduler system. It is described more fully in the Scheduler Structure Patent referenced above.

The scheduler system illustrated in FIG. 3 is comprised of a plurality of flows 210, time-based calendars 220, 230, 250, weighted fair queueing (WFQ) calendars 240 and target port queues 260.

The flows 210 are control structures that are used to maintain ordered lists of frames which share common system characteristics based on assignment, that is, the level of service that the associated user has selected and paid for. These characteristics include minimum bandwidth, peak bandwidth, best effort bandwidth and maximum burst size quality of service (QoS) requirements. In addition to flow queues set up for the purpose of supporting QoS for communication systems, the preferred embodiment requires flow queues defined for the purpose of discarding frames (i.e. filtered traffic), and the wrapping of frame data from the egress to the ingress of the network processor system.

Time-based calendars 220, 230, 250 are used for scheduling packets with minimum bandwidth and best effort peak rate requirements. As shown in FIG. 3, three time based calendars are used for this purpose: two calendars 220, 230 for minimum bandwidth and a third calendar 250 used to limit flow queues to a maximum best effort peak rate (peak bandwidth shaping). Two time-based calendars 220, 230 (one calendar 220 identified as low latency service or LLS and the other calendar 230 identified as normal latency service or NLS) provide for minimum bandwidth and allow support of different classes of service within a minimum bandwidth QoS class (i.e., low latency and normal latency).

Weighted fair queuing (WFQ) calendars 240 are used for best effort service, and best effort peak service (when used in combination with one of the time-based calendars 220, 230). Further, the WFQ calendars 240 support a queue weight that allows support of different classes of service within a best effort service QoS class. In the preferred embodiment there are 40 such WFQ calendars, corresponding to the number of supported media ports (output ports). The selection of 40 such ports is a trade off between hardware cost and design complexity and is not intended to limit the scope of the invention.

In each of the above mentioned calendars, a pointer (a Flow ID) is used to represent a flow queue's on within the calendar. Thus, flow 0 has its Flow ID 221 in calendar 220, flow 1 has a FlowID 232 in calendar 230 and FlowID 241 in the WFQ 240 and flow 2047 has a FlowID 231 in calendar 230 and FlowID 251 in calendar 250, all as indicated by the arrows in FIG. 3. Further there may be none, one, or two such pointers to a single flow queue present in the plurality calendars in the system. Typically, pointers in a calendar do not represent un-initialized or empty flow queues. When a pointer to a flow queue (or a FlowID) is present in a particular calendar in the system, the flow queue may be referred to as being "in" that particular calendar.

Target port queues are control structures used to maintain ordered lists of frames that have common port destination and priorities. In the preferred embodiment, 2 priorities per media port (or output port) are provided to allow support of different classes of service, a so-called high priority target port queue and a so-called low priority target port queue. The selection of 2 priorities is a trade off between hardware cost and design complexity and is not intended to limit the scope of the invention. Further, the preferred embodiment includes a separate wrap queue 272 and a discard port queue 270.

Figure 4:
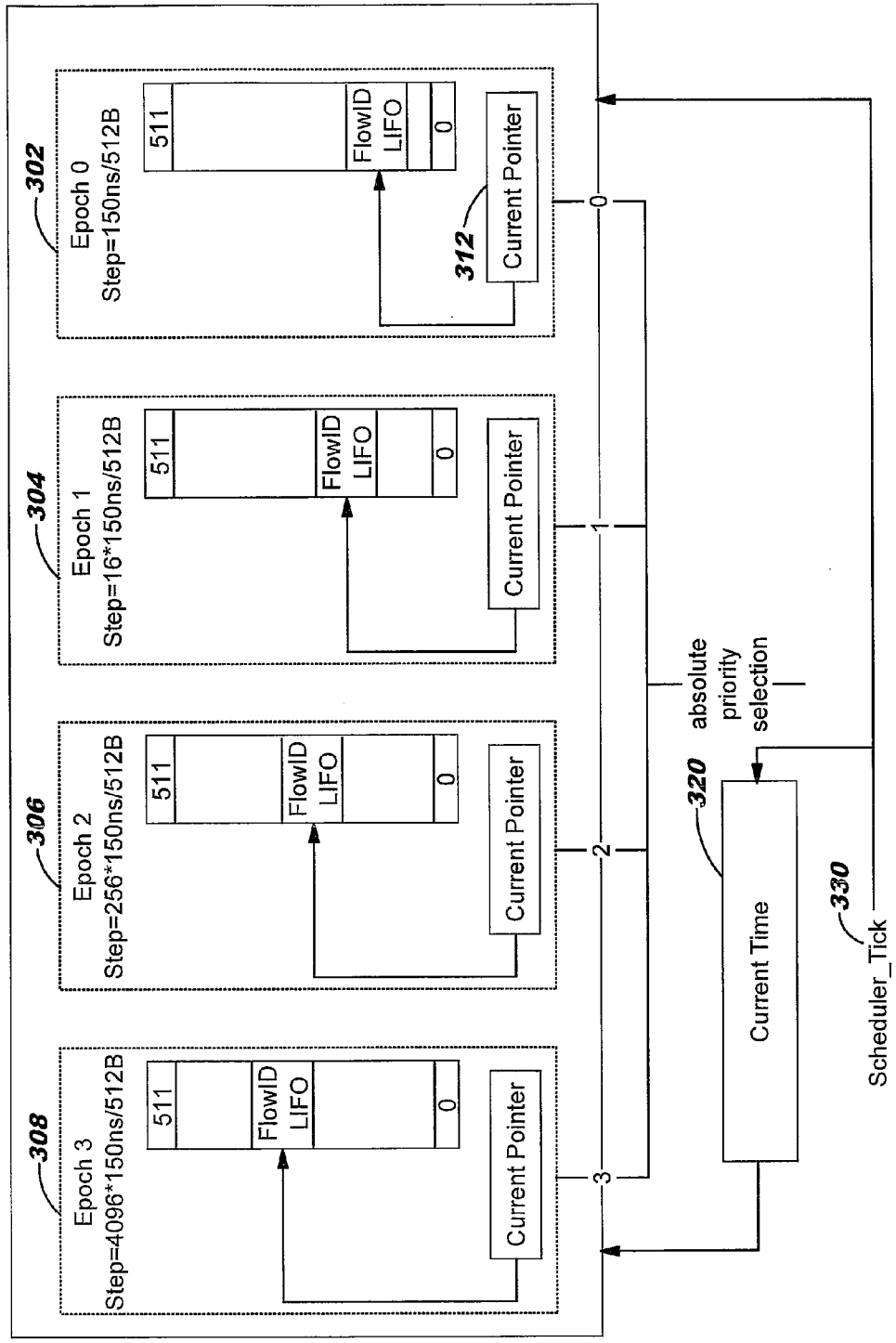
FIG. 4 illustrates a current time register for the egress scheduler of FIG. 3, showing its component epochs.

Each of the time-based calendars 220, 230 and 250 consists of a plurality of epochs, with four shown for each in FIG. 3 as represented by the overlapping rectangles. FIG. 4 shows the four epochs 302, 304, 306 and 308 along with a typical timing arrangement for the epochs where the first epoch 302 (labeled epoch0) has a step of the scheduler tick (allowing 512 bytes every 150 nsec in this case), the second epoch 304 has a step of 16 times that of the first epoch 302, with the third epoch 306 having the same ratio to the second epoch 304 and the fourth epoch 308 having the same ratio to the third epoch 306. In this way the first epoch 302 has a high priority (it is scheduled for service sixteen times as often as e second epoch 304. This arrangement creates a hierarchy of service priorities which will have associated increases in cost. A current pointer (e.g., 312 for epoch 302) is associated with each epoch to provide a pointer as to where in the queue the processing is currently located. Since the present system of progressing through the epochs is to increment the current pointer, the direction of processing is from lower to higher in the epoch. Also shown in this FIG. 4 is the current time 320 and a scheduler tick 330 which drives the clock 320 as well as driving the steps within each epoch.

The priority selection is an absolute priority selection, which means that since only one can be serviced during any interval, the one with the highest priority is serviced. If the current pointer in each of the epochs points to a data flow, the lowest one (epoch0) will be serviced. If epoch 0 requires no service, then epoch1 is serviced, then epoch2, etc.

Figure 5:
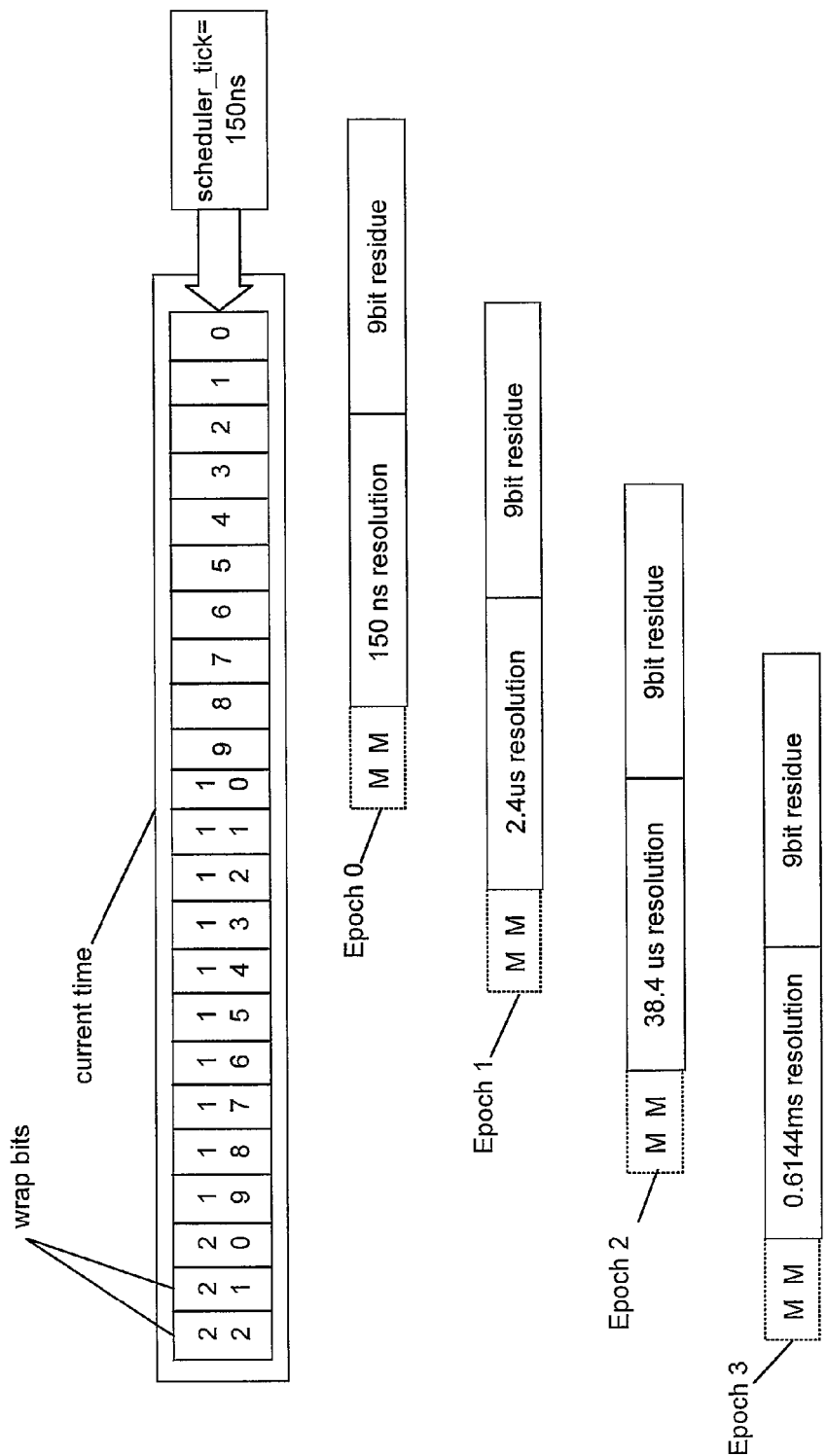
FIG. 5 illustrates a diagram showing how the epochs of FIG. 4 have different time resolutions in the egress scheduler of FIG. 3.

FIG. 5 illustrates the time resolution of bits for each of the epochs of FIG. 4. That is, it tells you which bits in the current time store (a 23 bit counter) are associated with each of the epochs as describer later in this document.

FIG. 6 illustrates the parameters of the communications from a user. The bandwidth used is plotted on the Y axis and time on the X axis. A user may have assigned a sustained bandwidth marked with arrow 350 and may be permitted to have a peak burst bandwidth marked with arrow 360 for a duration shown by the width 370 of the burst. A delay or quiet time shown by the absence of bandwidth during the time 380 may be imposed as a price for using the peak burst bandwidth and may be enforced through the use of credits known as MBS as will be explained in detail later in this document.

When a queue becomes empty, it is removed from the calendars in a form of disconnection. When a queue which is not in any calendar begins to receive frames, it is treated as a new queue in a process called connection (or re-connection for the return of a queue which has previously been receiving frames). The process of disconnection and then reconnection might have the undesirable result of allowing the queue to be placed at the calendar location pointed to by the current (time) pointer, in front of (earlier) where it would be if it was continuing in its place with its calendar location calculated after each servicing.

Conversion of current time to time based calendar location

Current time is converted into a location within the timer based calendar by examination of the current time, the scaling factors between epochs and the number of slots used for each epoch. In the preferred embodiment, the scaling factor is 16 and there are 512 slots in each epoch, hence nine bits are required for each epoch to identify a location within the epoch. As illustrated in FIG. 5, bits 8 through 0 are used to define a location within epoch 0, bits 12 through 4 for epoch 1, bits 16 through 8 for epoch 2 and bits 20 through 12 for epoch 3.

Determining the location in a WFQ calendar when adding a flow queue

The Queueing Patent referenced above discloses the details of a weighted fair queue where bandwidth which is not needed for minimum bandwidth customers can be used on a best effort basis with users sharing according to a formula which determines the order for the next service in the queue based on a weight or priority and the length of frame.

When a packet is enqueued to a flow queue, and the flow queue is added to a WFQ, as described in the Scheduler Structure Patent referenced above, the location within the WFQ calendar 240 of FIG. 3 is determined in one of the following fashions.

1. Add to the location indicated by the WFQ calendar's current pointer.
2. Add to the location immediately preceding the location indicated by the WFQ calendar's current pointer.
3. Use the weight of the flow queue, QD, to determine the distance from the location indicated by the current pointer.

In the preferred embodiment, the weight of the flow queue is used to determine the distance from the location indicated by the current pointer that the flow queue will be located. The distance calculation has the form:

Slot distance=Min((QD * S), 1)

Where S is a scaling factor that may take on any positive integer value. In the preferred embodiment the scaling factor S is 16.

Conversion of current time to NextGreenTime

NextGreenTime is the time stamp field used by a WFQ calendar 240 to provide peak bandwidth shaping (in combination with the peak bandwidth shaping calendar). Converting the current time into the NextGreenTime (NxtGT.V, NxtGT.E in the preferred embodiment) requires examination of the peak service rate field of the flow queue control block.

In the preferred embodiment, the value of PSD.E, is used to determine the bits used from the current time for the NxtGT.V field as shown below:

| PSD.E | current time bits |
|---|---|
| 0 | 8 through 0 |
| 1 | 12 through 4 |
| 2 | 16 through 8 |
| 3 | 20 through 12 |

The NxtGT.E is set equal to the value of PSD.E.

Comparison (later than test) between NextRedTime or NextGreenTime and current time In the preferred embodiment, the following steps comprise the method which allows a comparison between a time stamp from the flow queue control block with the current time.

1. Select bits from current time to perform the comparison. This set requires examination of the "dot E" field from the time stamp (NextRedTime or NextGreenTime) that is to be compared.

| dot E | current time bits |
|-------|-------------------|
| 0     | 8 through 0       |
| 1     | 12 through 4      |
| 2     | 16 through 8      |
| 3     | 20 through 12     |

2. To determine if a "A" is later than "B", first form the 2's complement of B and then add the result to A ignoring any carry out from the operation. When the result is non-zero, and the most significant bit of the result is 0, then A is later than B, otherwise B is later than A.

Conversion of NextRedTime or NextGreenTime into a location in a time based calendar The time stamp fields in the flow queue control block serve as part of the method which prevents a flow queue from violating its service parameters. In the preferred embodiment, the "dot E" field indicates the epoch and the "dot V" field indicates the distance from location 0 within the epoch.

NextGreenTime calculation when a flow is in violation of peak rate (use NextGreenTime as base)

In the preferred embodiment, the calculation of the NextGreenTime when a flow is in violation of its peak rate is determined by an examination of the BCI, which determines the packet length in bytes, the peak service rate, and the current value of the NextGreenTime. In FIG. 7, FL represents the byte length of the frame as determined from the BCI. The process blocks are described below.

Process 2 is a slot distance calculation (Temp)when the scaling factors (dot E) are the same for both the NextGreenTime and the peak service rate.

Process 4 is a slot distance calculation (Temp) when the peak service rate scaling factor is greater than the scaling factor for the NextGreenTime.

Process 5 is a slot distance calculation (Temp) when the peak service rate scaling factor is less than the scaling factor for the NextGreenTime.

Process 7 is a calculation of the NxtGT.V and NxtGT.E values when the slot distance (Temp) is greater than the capacity of the current scaling factor (for the preferred embodiment, the dot V values cannot exceed 511).

Process 10 is a calculation of the NxtGT.V and NxtGT.E values when the slot distance (Temp) allows for a reduction of the current scaling factor. This is desirable since the smaller the scaling factor, the more accurate the time base.

Process 11 is a calculation of the NxtGT.V value when the slot distance (Temp) does not require or allow a change of the current scaling factor. The value of NxtGT.E remains unchanged.

NextGreenTime calculation when a flow is not in violation of peak rate (use current time as base)

In the preferred embodiment, the calculation of the NextGreenTime when a flow is not in violation of its peak rate is determined by an examination of the BCI, which determines the packet length in bytes, the peak service rate, and the current time, and is illustrated in FIG. 8. The process blocks are described below. In FIG. 8, FL represents the byte length of the frame as determined from the BCI.

Process 21 is a slot distance calculation (Temp).

Based on the scaling factor used for the peak service rate, process blocks 23, 25, 27, and 29 assign the value of the base time (BaseT) from bits in the current time register. NextGreenTime will be determined from the slot distance, 15 the scaling factor and the base time.

Process 31 is a calculation of the NxtGT.V and NxtGT.E values when the slot distance (Temp) is greater than the capacity of the current scaling factor (for the preferred embodiment, the dot V values cannot exceed 511).

Process 34 is a calculation of the NxtGT.V and NxtGT.E values when the slot distance (Temp) allows for a reduction of the current scaling factor. This is desirable since the smaller the scaling factor, the more accurate the time base.

Process 35 is a calculation of the NxtGT.V and NxtGT.E values when the slot distance (Temp) does not require or allow a change of the current scaling factor.

MBS earned credit calculation

In the preferred embodiment, a flow queue which is in use (QinUse=1) with a non-zero Max Burst field, earns tokens when the flow queue is empty. The MBSCredit field is updated when a packet is enqueued into the empty flow queue. To determine the number of tokens earned, the NextRedTime and the current time are examined, and is illustrated in FIG. 9.

Based on the scaling factor used by the NextRedTime, bits from the current time are selected in process blocks 302, 303, 305, and 307 to create a scaled time (TimeA) used to determine how long the flow queue has been empty.

Decision block 308 determines if TimeA is later than the time indicated by the NextRedTime time stamp field. Using the NextRedTime for this purpose requires that the flow queue remains empty after it's next possible scheduling time. If TimeA is not later than the NextRedTime, then no further action is taken.

Decision block 309 deals with the timer wrap cases and allows the calculation of duration (TimeT) which the flow queue is accumulating tokens in process blocks 311 and 310.

Process blocks 313, 315, and 316 are the final calculations for MBSCredit.V. Decision blocks 312 and 314, determine if TimeT requires adjustment due to scaling factors used to define the MBS field.

MBS credit used calculation

The new value for MBSCredit is determined from the current value of MBSCredit, the BCI to determine the frame length, and the sustained service rate. Using the sustained rate is due to the method used when calculating the MBS value (which removed complex division from the equations.) In the preferred embodiment, MBSCredit may take on negative values. The process blocks are described below. In FIG. 10, FL represents the byte length of the frame as determined from the BCI.

Process blocks 402, 404 and 405 determine number of tokens used for a frame of length FL. Decision blocks 401 and 403 are used to determine if Temp requires adjustment due to scaling factors used to define the MBSCredit field.

Process block 406 adjusts the value of MBSCredit.V by the number of tokens used.

Flow queue control block aging

The use of scaling factors in the flow queue control block reduces the hardware needed for the maintenance of timestamp fields. In order to accurately determine when a time stamp is too old to be relevant a method is required to indicate that the time stamp and residue fields are not valid. FIGS. 11 and 12 illustrate a method of marking flow queue control blocks whose time stamps are no longer valid.

Added to the scheduler system described in the Scheduler Structure Patent is a list of all flow queue control blocks that are currently in use (QinUse=1). Those skilled in the art know there are many ways to maintain such a list.

In the preferred embodiment, the dot V fields of the time stamp fields are extended by two bits. These additional bits are taken from the current time pointer when the time stamp fields are updated. The bits used from the current time pointer are determined by the value of the dot E field, as illustrated in FIG. 5, and is as follows:

| dot E | current time bits used |
|---|---|
| 0 | 10 through 9 |
| 1 | 14 through 13 |
| 2 | 18 through 17 |
| 3 | 22 through 21 |

A timer is used to determine when the process of checking flow queue control blocks occurs. Referring to FIG. 11, the method starts with a check of an 'Aging Service Tick'. This when true, the process continues with selecting a flow queue control block (QCB) from the aging list 502. The process continues at 503 with a check of the QinUse field of the selected flow queue control block.

If the flow queue control block is not in use the process returns to 501 and waits for the next service tick, otherwise the process continues with an examination of the sustained service rate field 504 and the QinRed field 505. If the flow queue has a specification for sustained service and the flow queue is not in either the LLS or NLS calendar (QinRed=0), then a determination of aging occurs at 506. The actions taken for "TestAge" are described below.

If the flow queue does not have a sustained service rate specification, the peak service rate field is examined 507. If there is no peak service rate specified, the process continues at 501 and waits for the next service tick. If a peak service rate is specified, then the flow queue control block is examined to determine if the flow queue is in either a WFQ calendar 508 or in the peak bandwidth shaping calendar 509. If the flow queue is in either, the process returns to 501, otherwise a determination of aging occurs at 510. The actions taken for "TestAge" are described below.

TestAge, illustrated in FIG. 12, uses as input one of the timestamp fields of the flow queue control block, and the current time. It returns to the process an update to the state of the QinUse field. In flowchart 5, this result is used in 512 and 513 to update the flow queue control block and to remove the flow queue control block from the aging list.

Returning to FIG. 12, the TestAge process uses the scaling factor E to determine which bits of the current time are used to determine if the time stamp field is too old to retain its usefulness. Blocks 600 through 606 accomplish this task.

Continuing at 606 and 607, a comparison is made between the high order bits of the dot V field (MM bits as defined above and illustrated in FIG. 3.) and the selected bits of the current time. The tests in 607 and 608 determine if the epoch associated with the time stamp has wrapped more than once since last updated. If more than one wrap has occurred, the time stamp is no longer usable and the time stamp fields are marked invalid by the action of setting the QinUse bit to zero, otherwise the QinUse bit is left unchanged (blocks 609, 610).

Of course, many modifications of the present invention will be apparent to those skilled in the relevant art in view of the foregoing description of the preferred embodiment, taken together with the accompanying drawings. For example, the use of time-varying epochs and their number and interrelationship are subject to design choice. The algorithm for determining the credit for burst size and duration are all matters of design choice and more or less could be used to advantage. Additionally, many modifications can be made to the system implementation and the system of priorities and various algorithms can be used for determining priority of service without departing from the spirit of the present invention. Further, some of the features of the present invention can be used without the corresponding use of other features. Accordingly, the foregoing description of the preferred embodiment should be considered as merely illustrative of the principles of the present invention and not in limitation thereof

Having thus described the invention, what is claimed is:

1. A system for periodically moving information units from a plurality of sources to an output destination of a data transmission network, the system comprising:

a time-based calendar which handles scheduling of a first set of the information units with minimum bandwidth and best effort peak rate requirements, said scheduling based on information related to the plurality of sources and provides calculated times for scheduling each of the plurality of sources via queues that contain a flow, wherein the plurality of sources include a plurality of queues representing respective ones of the sources and wherein each queue holds a number of informational units, one or more of which may be dispatched from the respective queue when the queue is in a current time position at which a time pointer points;

a time-independent calendar which handles scheduling of a remaining set of the information units that are not within the first set, said time-independent calendar handling the scheduling of the remaining set based on information stored about the plurality of sources and which places each source into a calendar location and moves the source to a different place in the time-independent calendar of lower priority relative to a current calendar location of the source after servicing the source;

a mechanism for: (a) when a flow is added to an empty queue of a first source at a current scheduling time, determining whether that first source, was previously assigned a first location in the time-based calendar, and whether the first source would have been assigned a previously-calculated second location of lower time priority than the current scheduling time had the queue not gone empty following completion of information dispatch when the first source was at the first location; and (b) when the source would have been assigned a previously-calculated second location of lower time priority, then (1) preventing the source from being placed at the current scheduling time or a third location that is of higher priority than the previously-calculated second location in the time-based calendar and (2) placing the source at a location selected from among the previously-calculated location and a next location that is of lower priority than the previously-calculated location within the time-based calendar; and means for automatically servicing the source by causing a frame consisting of the informational unit(s) to be transmitted from said source to the output destination when a pointer of the time-based calendar points to the location at which the source is currently located.

2. The system of claim 1 wherein the plurality of sources include a plurality of queues representing respective ones of the sources and wherein each queue holds a number of informational units, one or more of which may be dispatched from the respective source when the source is in a current time position at which the time pointer points.

3. The system of claim 2 wherein the calculated position includes the position at which the queue of the source would have been attached within the time-based calendar, upstream from the position at which said queue was last serviced.

4. The system of claim 1 wherein said mechanism includes logic for attaching a queue of the source to the selected position.

5. The system of claim 1, wherein the information includes time stamps identifying a time at which the queue of the source is attached to the position within the time-based calendar.

6. The system of claim 1, wherein the time-based calendar is a weighted fair queuing calendar, said method further comprising performing said calculating of the second location using a slot distance to adjust for a size of a frame and a queue weight.

7. The system of claim 1, wherein said time based calendar is divided into a plurality of epochs, having an associated priority relative to each other and respective timing characteristics for scheduling, wherein a flow within a higher priority epoch is processed before a flow within a lower priority epoch for a particular location within the calendar.

8. The system of claim 1, further comprising a plurality of flow control structures utilized to maintain ordered lists of frames that share common system characteristics based on assignment, said characteristics comprising: minimum bandwidth, peak bandwidth, best effort bandwidth and maximum burst size quality of service.

9. A method for servicing data flows placed into a queue, said method comprising;
providing at least one time-based calendar having a plurality of locations and a time pointer moving relative to the plurality of locations as a result of scheduler ticks, each tick measured as a predetermined ratio of elapse time per pre-set number of bytes transmitted;
attaching the queue to a first calendar location;
when the time pointer is pointing to the first calendar location, servicing said queue by causing a frame to be transmitted from said queue;
updating a location of the time pointer to service a next, later location within the time-based calendar;
identifying a second location within the time based calendar at which the queue would be re-attached if the queue is not gone empty;
examining pre-defined characteristics associated with said queue to determine occupancy frames within said queue;
when the queue is not empty, identifying a current location at which the time pointer points;
selecting a location which is not earlier than the second location to re-attach the queue, wherein when the current location of the time pointer is not earlier than the second location, the queue is reattached at the current location of the time pointer and when the current location is earlier than the second location, the queue is re-attached at the second location; and
automatically servicing a data flow of the queue by causing a frame to be transmitted from said queue to an output destination when the time pointer of the time-based calendar points to the location at which the queue is re-attached.

10. The method of claim 9 wherein the un-empty queue is attached to the selected location.

11. The method of claims 9 or 10 wherein the queue is attached by writing the Identification number of said queue in a stack located at each location.

12. The method of claim 11 wherein the stack is a Last In First Out (LIFO) stack.

13. The method of claim 9, further comprising:
when the queue is empty and receives a service flow, calculating a new location in the calendar for the queue;
determining whether the queue was previously attached at a first location in the calendar and whether a second location was previously calculated;
when the queue was previously attached at the first location, retrieving the previously-calculated second location with the calendar for re-attaching the queue;
determining whether the new location that would be presently assigned to the queue is earlier than the pre-calculated second location within the calendar;
re-attaching the queue at the selected one of the new location and the previously-calculated, second location, wherein:
if the new location is earlier than the previously-calculated, second location, assigning the previously-calculated, second location to the queue; and
if the new location is not earlier than the previously-calculated, second location, assigning the new location to queue;
when the time pointer points to the location at which the queue is re-attached, automatically servicing the data flows of the queue by causing a frame consisting of informational unit(s) to be transmitted from said queue to an output destination when the time pointer of the time-based calendar points to the location at which the queue is currently located, wherein said time based calendar schedules packets/frames with minimum bandwidth and best effort peak rate requirements.

14. The method of claim 9, wherein the selected location to re-attach the queue is the current location when the current location is not earlier than the second location.

15. The method of claim 9, further comprising scheduling a plurality of request for service utilizing a last-in-first out mechanism to schedule a last received request to transmit first during a time slot within the calendar allocated to the particular queue.

16. The method of claim 9, wherein said time based calendar is divided into a plurality of epochs, having an associated priority relative to each other and respective timing characteristics for scheduling, said method comprising processing a flow within a higher priority epoch before a flow within a lower priority epoch for a particular location within the calendar.

17. The method of claim 16, further comprising converting a current time into a location within the time based calendar, said converting comprising an examination of the current time along with scaling factors between epochs.

* * * * *